United States Patent [19]

Schuster

[11] Patent Number: 5,304,024

[45] Date of Patent: Apr. 19, 1994

[54] SCREW, METHOD AND ROLLING DIE FOR THE PRODUCTION THEREOF

[75] Inventor: Armin Schuster, Forchtenberg, Fed. Rep. of Germany

[73] Assignee: Adolf Wurth GmbH & Co. KG, Fed. Rep. of Germany

[21] Appl. No.: 933,050

[22] Filed: Aug. 19, 1992

[30] Foreign Application Priority Data

Mar. 17, 1992 [XH] Hague .................. 92104533.2

[51] Int. Cl.$^5$ .................................. F16B 35/04
[52] U.S. Cl. .................... 411/418; 411/387; 411/411
[58] Field of Search ............. 411/387, 389, 411, 412, 411/418, 308, 309, 310, 311, 414

[56] References Cited

U.S. PATENT DOCUMENTS

| 449,887 | 4/1891 | Rogers ........................ 411/411 |
| 2,021,704 | 1/1932 | Thatcher et al. . |
| 2,428,783 | 10/1947 | Cole . |
| 2,827,820 | 3/1958 | Vellier ........................ 411/411 |
| 3,083,609 | 4/1963 | Lovisek ....................... 411/418 X |
| 3,183,531 | 5/1965 | McKewan .................... 411/411 X |
| 3,748,949 | 7/1973 | Dreger . |
| 3,794,092 | 2/1974 | Carlson et al. . |
| 3,942,405 | 3/1976 | Wagner ....................... 411/412 X |
| 4,255,959 | 3/1981 | Muenchinger . |
| 4,329,099 | 5/1982 | Shimizu et al. .............. 411/412 |
| 4,527,932 | 7/1985 | Onasch et al. ............... 411/411 |
| 4,742,663 | 5/1988 | Demers ....................... 411/387 X |

FOREIGN PATENT DOCUMENTS

| 121108 | 10/1984 | European Pat. Off. ........... 411/387 |
| 2318088 | 4/1974 | Fed. Rep. of Germany . |
| 2405430 | 12/1974 | Fed. Rep. of Germany . |
| 2747312 | 4/1979 | Fed. Rep. of Germany . |
| 3207975 | 9/1983 | Fed. Rep. of Germany . |
| 55796 | 1/1975 | Sweden . |
| 566907 | 1/1945 | United Kingdom ............ 411/411 |
| 943575 | 12/1963 | United Kingdom ............ 411/411 |
| 2232219 | 12/1990 | United Kingdom ............ 411/412 |
| 2235744 | 3/1991 | United Kingdom ............ 411/386 |

OTHER PUBLICATIONS

Kunststoffe, 74 (Jul. 1984) Juli, No. 7, Munchen, Deutschland.

Primary Examiner—Rodney M. Lindsey
Attorney, Agent, or Firm—Quarles & Brady

[57] ABSTRACT

A screw has a thread (3), whose front and rear flanks have a different angle with respect to the screw longitudinal axis. The screw tip (2) can contain a scraping groove (6), which extends as a notch in the screw longitudinal direction. In the front, conically tapering area of the screw the thread course is constructed symmetrically and extends up to the tip.

11 Claims, 3 Drawing Sheets

SCREW, METHOD AND ROLLING DIE FOR THE PRODUCTION THEREOF

DESCRIPTION

1. Field of the Invention

The invention relates to a screw, particularly a chipboard screw, as well as to a method and rolling die for the production thereof.

2. Background of the Invention

Chipboards have long been used as a substitute for wood and are processed in much the same way as wood. However, in part, they have different characteristics to wood, particularly when screws are used. As the fibrous material of normal wood does not exist in chipboard, there is in particular a risk of the chipboard screws tearing out and of the chipboard breaking off.

A screw is already known (DE-A1-22 51 115), which for improving the holding power in materials having a limited density has an asymmetrically constructed thread, in which the front flank toward the screw tip is flatter or shallower than the rear flank.

A self-tapping screw is also known (DE-B-23 18 088), which is also suitable for high-quality chipboard. This screw also has a thread with an asymmetrical profile and in addition the cutting edges are corrugated. One thread course extends up to the screw tip or point.

In the case of self-tapping screws which are intended for use in plastic (DE-A1-32 07 07), it is known to provide the thread flanks of a symmetrical thread profile with a rounded transition to the screw shank. As a result of said rounded transition, the plastic, which significantly heats during the screwing process, flows into the thread valleys. This is intended to prevent damage due to plastic crack formation.

SUMMARY OF THE INVENTION

An object of the invention is to provide a screw that is particularly suitable for chipboard, which has a reduced screwing resistance, an increased overtightening moment, has improved extraction values and can be rapidly screwed.

Whereas in the case of the known chipboard screws, the aim is to apply the thread courses or pitches in as sharp-edged manner as possible to the screw core, the invention intentionally has a rounded transition which reduces the notch effect. As a result there is an increase of the thread courses on the screw. The radius of curvature of the rounded transition can be e.g. between ⅛ and 1/12 of the nominal screw diameter and is advantageously approximately 1/10 thereof.

As the screw thread is increased, according to a further development of the screw according to the invention, the ratio of the external diameter to the core diameter of the screw is greater than in known screws having the same nominal size. Thus, in the case of a screw with the same nominal size, the inventive screw has a somewhat thinner core than known screws. As a result, screwing resistance is further reduced.

To facilitate the screwing of the thread into the chipboard, according to the invention, in the vicinity of its tip or point, the screw has at least one scraping groove. This scraping groove has a supporting action during the formation of the hole starting at the screw tip. In particular, the scraping groove can be shaped like a notch running in the longitudinal direction of the screw. The notch can in particular be bounded by two meeting boundary faces, which e.g. form an angle of approximately 90° with one another.

According to the invention, the scraping groove can traverse the thread or thread course and extend roughly up to the screw core. It can optionally also extend into the core of the screw tip.

According to a further development of the invention, the scraping groove can end forward of the screw tip junction with the cylindrical port of the screw, i.e. does not extend into the cylindrical part of the screw shank. The scraping groove is not intended to enlarge the tap, but merely to have an assisting action in the production of a hole corresponding to the screw core diameter.

According to the invention, the thread can be constructed as a double-start thread to enable the screw to be inserted faster.

According to a further development of the invention, in order to increase the holding power or improve the overtightening moment, the thread is given an asymmetrical shape and in particular, the front thread course flank facing the screw tip is flatter or shallower than the rear thread course flank facing the screw head. According to the invention, the rear flank should approximate a right angle with respect to the screw longitudinal axis, provided that this is possible during the manufacture of the screw by rolling. For practical reasons, the angle formed by the rear flank with a radial plane should be smaller than approximately 10°. In a preferred embodiment, the angle is 5°.

According to the invention, the front flank can form an angle with said radial plane of approximately 30° to 40° and in a preferred embodiment is approximately 35°. The thread courses overall are no sharper than in known threads, but there is a shape change compared with the hitherto symmetrical threads.

For faster screwing of the screw, it is necessary that the thread course, and in the case of a double-start thread, one of the two thread courses, extends as far as possible towards the tip. Only if the thread enters the chipboard, can the advance take place as a result of the thread. The inventor of the present application has discovered that rolling out of desired asymmetrically formed thread course up to the screw tip is difficult. It is only possible to produce the thread in this way with an adequate precision level when increased effort and expenditure are involved. In order to construct the screw in such a way that it rapidly bites, a further development of the invention proposes constructing the thread in the vicinity of the screw tip from less asymmetrical to completely symmetrical. In the area of the screw tip tapering forwards from the cylindrical shank, the thread is constructed from less asymmetrical to completely symmetrical, so that both thread flanks have essentially the same angle relative to a perpendicular to the longitudinal axis of the screw.

According to a further development, in said front area of the screw tip, the thread angle is larger than in the vicinity of the cylindrical shank.

It has been found that as a result of the symmetrical construction of the thread in the vicinity of the screw tip, it is possible to construct the thread in reproducible manner directly up to the tip, without any disadvantages with respect to further desired characteristics, namely, the improved extraction values and higher overtightening moment.

In the case of a double-start thread the invention proposes that one thread, course be extended up to the tip, whereas the second thread course stops in the transition area to the screw tip.

The thread course extending up to the tip and which has an asymmetrical shape over the entire shank has, in the vicinity of the tip, the aforementioned at least approximately symmetrical shape, optionally with an increased thread angle.

A further object of the invention is to provide a rolling die, making it possible to produce a screw, particularly a chipboard screw of the aforementioned type.

According to the invention, the method can have all those features mentioned in conjunction with the screw and the same applies with respect to the rolling die.

BRIEF DESCRIPTION OF THE DRAWINGS

Further features, details and advantages of the invention can be gathered from the following description of a preferred embodiment of the invention, the claims and the attached drawings, wherein show:

DETAILED DESCRIPTION OF THE PREFERRED EMBODIMENTS

Figure 1:
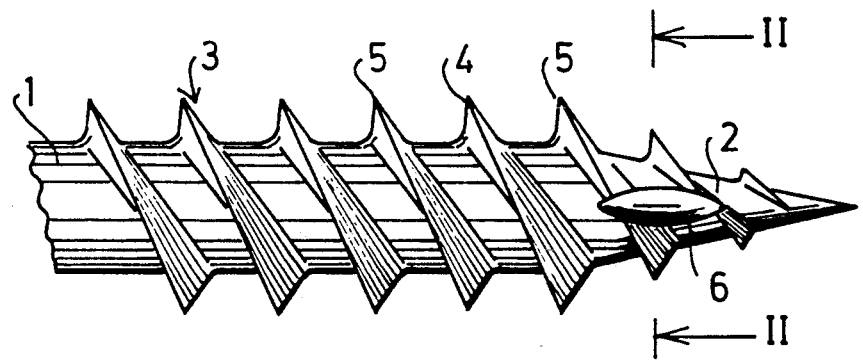
FIG. 1 A side view of the front region of a chipboard screw according to the invention.

The screw partly shown in FIG. 1 contains at one end a screw shank 1 of a screw head, not shown in the drawing and which is provided with a tool driving possibility. At the opposite end of the screw shank is a screw tip 2, which forms a point with an angle of approximately 24° relative to the longitudinal axis of the screw, and approximately 20° to 25°. Along the screw shank 1 extends a thread 3, which continues into the vicinity of the screw tip 2. The thread 3 preferably comprises at least two thread courses 4, 5. The height of the separate thread courses or pitches 4, 5 decrease in the vicinity of the tip 2. A thread course 4 begins directly at the front end of the screw tip 2, whereas the second thread course 5 only starts at a certain distance from the end of the screw tip 2 approximately ¾ of a thread pitch from the end.

Up to the junction with the screw tip 2, the screw shank 1 has the same core diameter and the thread 3 also has the same external diameter along the screw shank 1, which corresponds to the screw nominal diameter.

In the vicinity of the screw tip 2, a scraping groove 6 is formed in the screw and is preferably also produced during screw rolling. The scraping groove 6 is shaped like a notch and extends in the screw longitudinal direction. It starts at a distance to the rear of the front end of the screw tip 2 roughly corresponding to the thread pitch and ends roughly in the region in which the screw tip 2 transitions into the cylindrical part of the screw shank 1. The scraping groove 6 is essentially formed in the thread courses 4, 5, consequently does not cut the latter or the core.

Figure 2:
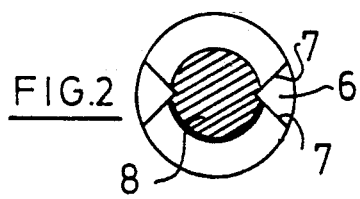
FIG. 2 A cross-section through the screw roughly level with the scraping groove.

As can be gathered from FIG. 2, which shows a cross-section through the screw, there are two such scraping grooves 6 in the form of a notch in each case. Both notches are bounded by two substantially planar boundary faces 7. In the represented preferred cases, the two boundary faces form roughly a right angle with one another. As stated, the notch is essentially located in the thread courses 4, 5 and only extends barely into the screw core 8.

Figure 3:
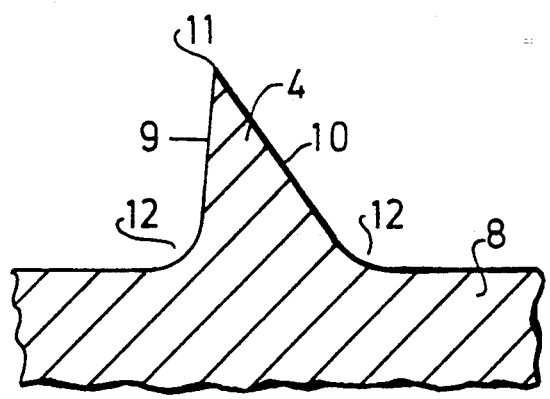
FIG. 3 On a larger scale a partial section through the screw showing the cross-sectional shape of the screw course.

FIG. 3 shows on a somewhat larger scale a partial section through the screw giving the cross-sectional shape of a thread course 4. The screw of FIG. 3 is oriented in the same direction as the screw of FIG. 1. The thread course 4 is bounded by two flanks 9, 10, which are linear in cross-section and meet for forming the helix 11. The flank 10 facing the screw tip 2 is referred to as the front flank, whereas the flank 9 of the thread course 4 facing the screw head is referred to as the rear flank. As shown in FIG. 3, the front flank 10 is inclined more than the rear flank 9. The rear flank 9 is almost at a right angle to the longitudinal axis of the screw, whereas the front flank 10 of the thread course 4 forms an obtuse angle with the screw longitudinal axis of much more than 90°. In other words, the rear flank 9 has an angle of less than 10° with a radial plane, whereas the front flank 10 has an angle of approximately 30° to 40°, preferably approximately 35° with the radial plane. The asymmetrical thread is advantageous for achieving improved overtightening moments.

As can also be gathered from the section of FIG. 3, the transitions 12 between the screw core 8 and the flanks 9 and 10 of the thread course 4 are rounded. The radius of curvature of said rounded transition 12 is approximately 1/10 of the screw nominal diameter. For a nominal diameter of 6 mm, the radius is consequently approximately 0.5 mm. As a result of the intentionally clearly rounded transitions 12, the screw strength, is increased.

Figure 4:
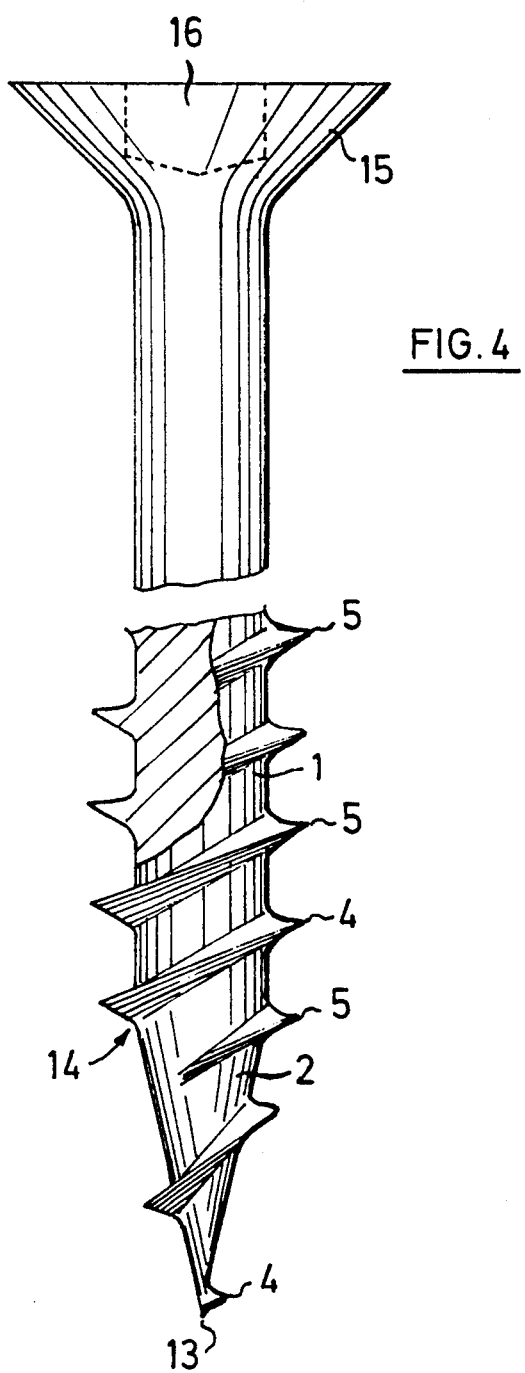
FIG. 4 A part sectional side view of another screw.

The screw shown in FIG. 4 does not have a scraping groove in the vicinity of the tip, but could also be provided with such a scraping groove as in the embodiment of FIGS. 1 to 3.

The thread of the screw according to FIG. 4 is once again a double-start thread with two thread courses 4, 5. One of the two thread courses 4 extends directly to the front end 13 of the screw tip 2. The other thread course 4 stops in the vicinity of the transition 14 between the cylindrical screw shank 1 and the substantially conical screw tip 2. From the point of the transition 14 there is a reduction in the height of the thread course 5, so that the latter disappears after roughly a ¼ turn.

In the vicinity of the screw tip 2, i.e. between the transition 14 and the front end 13 the thread course 4, which extends up to the front end 13, is provided with a symmetrically constructed profile. This means that the front and rear flanks of the thread course 5 in said area have the same angle with respect to a perpendicular to the screw longitudinal axis. This makes it more easily possible to construct said screw course 4 completely up to the front screw end 13. This means that the screw bites immediately at the start of screwing in. The immediate biting of the screw by its thread course is essential for the rapid screwing in behavior of the screw.

It has been found that the symmetrical construction of the thread in said front area leads to no disadvantages with regards to the ultimate strength and overtightening moment.

It is also possible to make the thread less asymmetrical in the front area than in the shank area. Once again this makes it possible to roll out the thread up to the tip.

As a result of the combination of different features, a screw is obtained, which can be easily manufactured and which has a limited screwing resistance and therefore a rapid screwing in in behavior and in which the overtightening moment and extraction values are high.

In the upper part of FIG. 4, the screw head 15 is shown as a countersunk head with the driving recess 16 shown diagrammatically therein. The thread angle in the shank area is approximately 35°, whereas that of the thread course 4 extending up to the front end 13 is approximately 40°.

Figure 5:
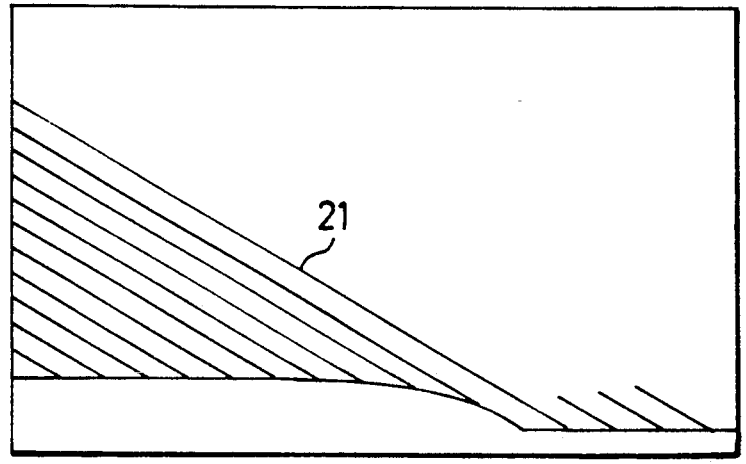
FIG. 5 A plan view of a rolling die for producing the screw.

FIG. 5 is a plan view of a rolling die, such as can be used for the manufacture of the screw according to FIGS. 1 to 4. The rolling die has a thread mating profile 21 which is at the lead angle. From the left-hand side in FIG. 5 the rolling die firstly receives an entry or intake area 22, as shown by the double arrow below the die 20. The thread is initially formed in this entry area. It can already be asymmetrical, but preference is given to a rolling die or a manufacture, in which the thread is initially still symmetrical in the entry area. To the entry area 22 is connected a transition area 23, where the existing thread is given the desired final, asymmetrical shape.

At the end of the transition region, the screw shank thread is completely produced and given its final shape. This is followed by a third region 24, in which the screw tip is shaped and given a thread. Consequently, the tip is formed following the screw shank thread production. At the end of the tip formation region 24, the shearing point 25 is reached, where shearing takes place of the wire forming the screw starting material. In the tip formation area the thread mating profile is once again at least approximately symmetrical, i.e. the asymmetry is less pronounced or there may even be a complete symmetry. It is adequate for the problem of the invention if e.g. the thread angle on one side of the thread is 20° and on the other side 30°.

Figure 6:
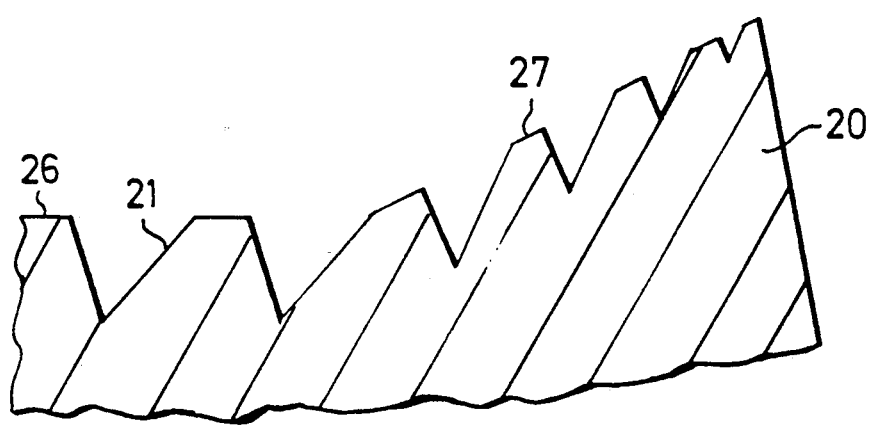
FIG. 6 A larger-scale section through the rolling die.

FIG. 6 shows on a much larger scale a cross-sectional through part of the rolling die 20 of FIG. 5, namely in the shearing point 25. In the shank area 26 to the left the thread mating profile 21 is clearly asymmetrical, whereas in the tip area 27 although the thread mating profile appears to be asymmetrical, the two flanks of each profile course are inclined by the same angle relative to a perpendicular to the screw longitudinal axis. FIG. 6 shows that the thread courses become slowly lower towards the tip.

The method according to the invention is performed with the rolling die shown in FIGS. 5 and 6. Thus, initially in the entry area 22 a preferably still symmetrical thread is shaped and in the following transition area is given its asymmetrical shape. Only when the thread has been completely produced is the screw tip formed, followed by shearing. During the shaping of the screw tip, there is optionally a smoothing of the complete thread.

I claim:

1. A screw with a screw shank having a screw thread, a screw head with a drive and a screw tip, said screw thread having at least one thread course, said thread course having a front flank facing the screw tip and an adjoining rear flank facing the screw head, wherein the transitions between the front and rear flanks of the thread course of the thread and the shank are rounded, the thread over at least part of the shank length having an asymmetrical shape in such a way that the rear flank of the at least one thread course is angled steeper with respect to a radial plane perpendicular to the longitudinal axis of the shank than the front flank, and wherein the thread is less asymmetrical in the vicinity of the screw tip than in the remaining portion of said shank.

2. A screw according to claim 1, wherein the angle of the screw tip is approximately 20° to 25° to the longitudinal axis of the screw shank.

3. A screw according to claim 1 further comprising at least one scraping groove in the vicinity of its screw tip, which has the shape of a notch running in the longitudinal direction of the screw and which has two boundary faces which meet one another at a right angle.

4. A screw according to claim 3, wherein the scraping groove traverses the thread and extends radially approximately to the screw core and ends between the screw tip and a cylindrical part of the screw shank.

5. A screw according to claim 1, wherein said screw thread has two separate thread courses.

6. A screw according to claim 1, wherein the front flank of the at least one thread course forms an angle approximately in the range of 30° to 40° with said radial plane.

7. A screw according to claim 1, wherein the rear flank of the at least one thread course forms an angle of less than 10° with said radial plane.

8. A screw according to claim 1, wherein a thread angle of the front and rear flanks is greater in the vicinity of the screw tip than in the vicinity of a cylindrical part of the shank.

9. A screw according to claim 1, wherein the screw thread includes two thread courses and one thread course extends up to a front screw end of the screw tip, the other thread course stopping in a transition region between a cylindrical part of the shank and the tip.

10. A screw according to claim 1, wherein the screw thread includes two thread courses and one thread course extends up to a front screw end of the tip whereas the second thread course extends to substantially a distance of ¾ the thread pitch from the tip front screw end.

11. A screw according to claim 1, wherein the screw thread includes two thread courses and one thread course extends to a front end of the screw tip and is given a symmetrical construction in the vicinity of the tip.

* * * * *

UNITED STATES PATENT AND TRADEMARK OFFICE
CERTIFICATE OF CORRECTION

PATENT NO.   : 5,304,024
DATED        : April 19, 1994
INVENTOR(S)  : Schuster

It is certified that error appears in the above-identified patent and that said Letters Patent is hereby corrected as shown below:

Item [30],
The title page, under "Foreign Application Priority Data", change "Hague" to --Europe--.

Column 2, line 9, replace "port" with --part--.

Signed and Sealed this

First Day of November, 1994

Attest:

BRUCE LEHMAN

*Attesting Officer*   *Commissioner of Patents and Trademarks*